United States Patent [19]

Boda

[11] Patent Number: 5,190,433

[45] Date of Patent: Mar. 2, 1993

[54] STRUCTURE FOR CENTER OF GRAVITY ENHANCEMENT FOR REAR LOADING COMPACTOR

[75] Inventor: Robert A. Boda, Ooltewah, Tenn.

[73] Assignee: McNeilus Truck and Manufacturing, Inc., Dodge Center, Minn.

[21] Appl. No.: 755,313

[22] Filed: Sep. 5, 1991

[51] Int. Cl.$^5$ .............................................. B65F 3/00
[52] U.S. Cl. .................... 414/525.1; 414/519; 298/23 MD; 296/203; 296/56
[58] Field of Search ............ 414/525, 525.1, 525.3, 414/525.4, 525.5, 525.51, 525.52, 525.53, 525.54, 525.55, 525.6, 525.7, 519, 520, 525.8, 507; 298/23 R, 23 MD, 23 M, 23 S, 23 A, 23 B, 23 F, 23 D, 23 DF, 23 C; 296/203, 204, 56, 184, 183

[56] References Cited

U.S. PATENT DOCUMENTS

| | | |
|---|---|---|
| 1,314,498 | 9/1919 | Bower . |
| 2,762,628 | 9/1956 | Terry ........................... 298/23 R X |
| 2,831,727 | 4/1958 | Wilkinson ................. 298/23 MD X |
| 3,280,994 | 10/1966 | Herpich et al. ................ 414/525.54 |
| 3,767,068 | 10/1973 | Herpich et al. ................ 414/525.52 |
| 4,353,565 | 10/1982 | Smith et al. . |
| 4,531,753 | 7/1985 | Hicks . |
| 4,551,055 | 11/1985 | Demenais ...................... 414/501 X |
| 4,580,805 | 4/1986 | Bertolini . |
| 4,635,742 | 1/1987 | Bertolini . |
| 4,660,843 | 4/1987 | Hicks . |
| 4,730,870 | 3/1988 | DeRees .......................... 296/204 X |
| 4,919,445 | 4/1990 | Robey . |

FOREIGN PATENT DOCUMENTS

1177499 9/1964 Fed. Rep. of Germany ...... 296/204

Primary Examiner—Frank E. Werner
Attorney, Agent, or Firm—Haugen and Nikolai

[57] ABSTRACT

An improved lower rear transfer brace member for a rear loading compactor type refuse truck body having a continuous lower rear transfer brace member, the truck body being designed to be accommodated on a truck chassis having a pair of spaced, substantially parallel longitudinal main chassis members which abut the continuous transfer brace substantially at right angles therewith and spacing the tailgate from the rear wheels is disclosed which accommodates the ends of the spaced longitudinal main chassis members without loss of continuity to thereby, in effect, move the relative position of the rear wheels back and allow the tailgate to be mounted closer to the rear wheels.

3 Claims, 4 Drawing Sheets

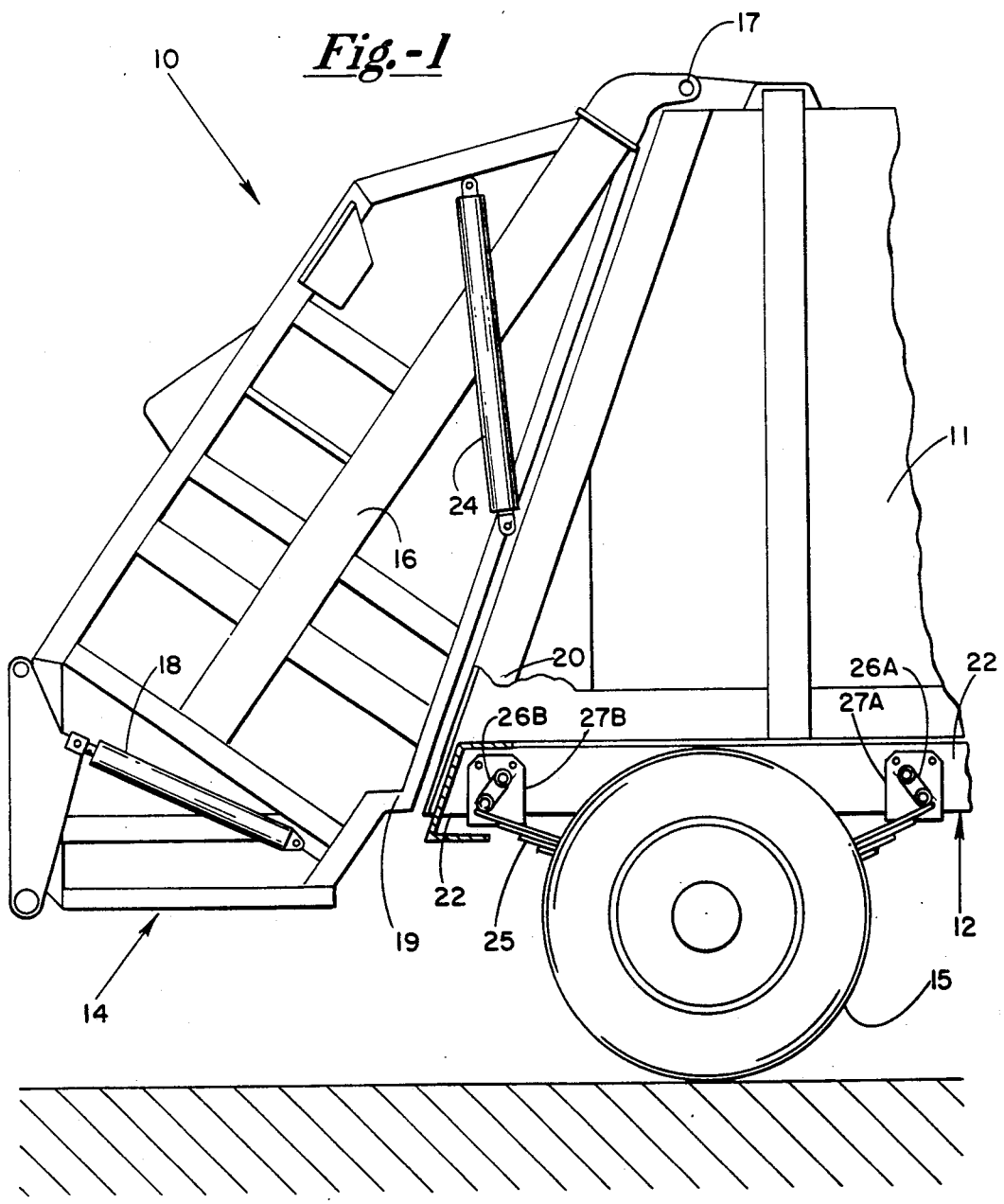

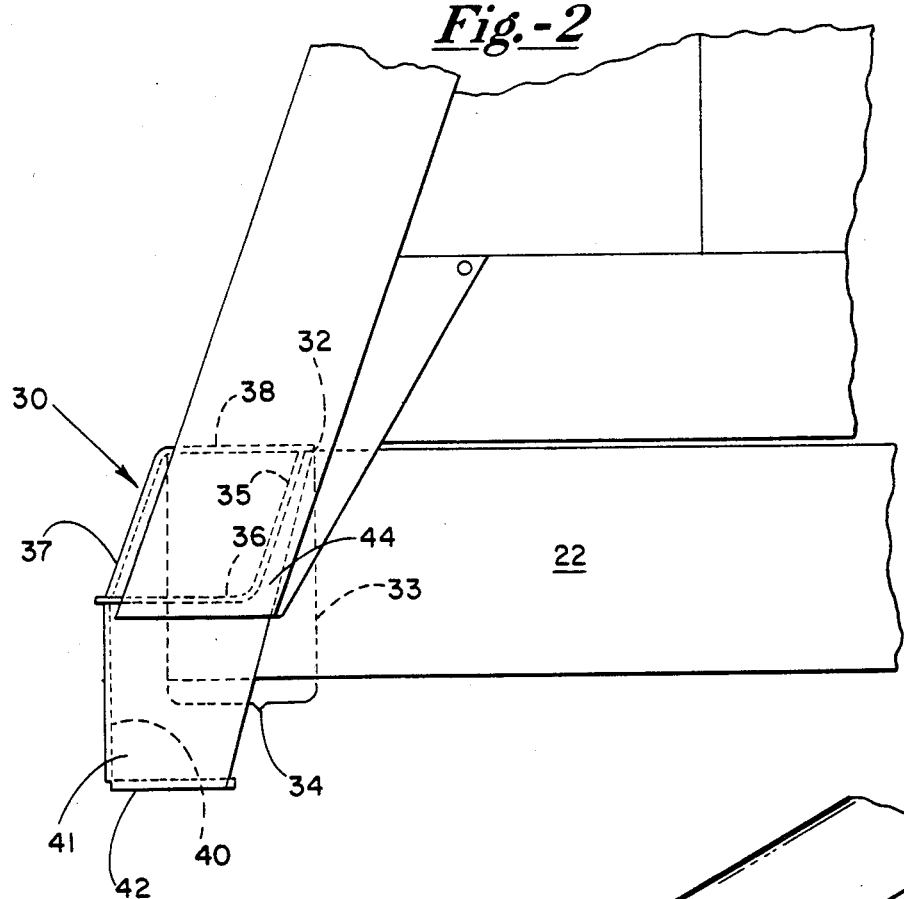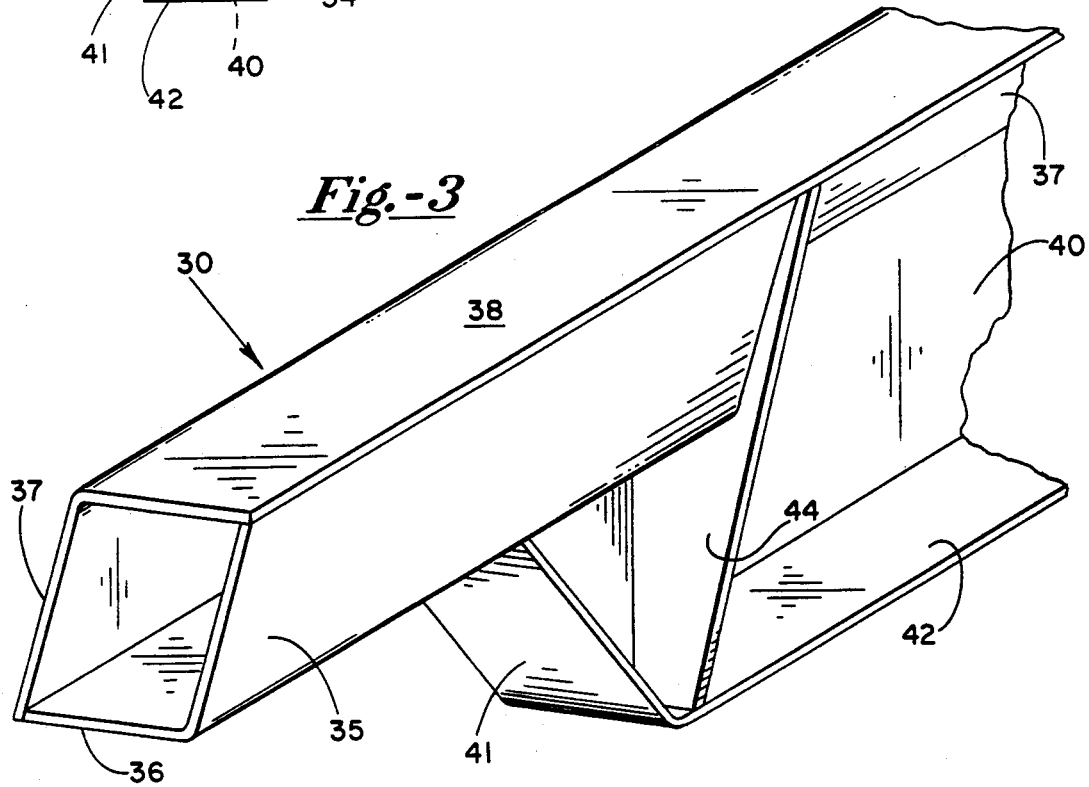

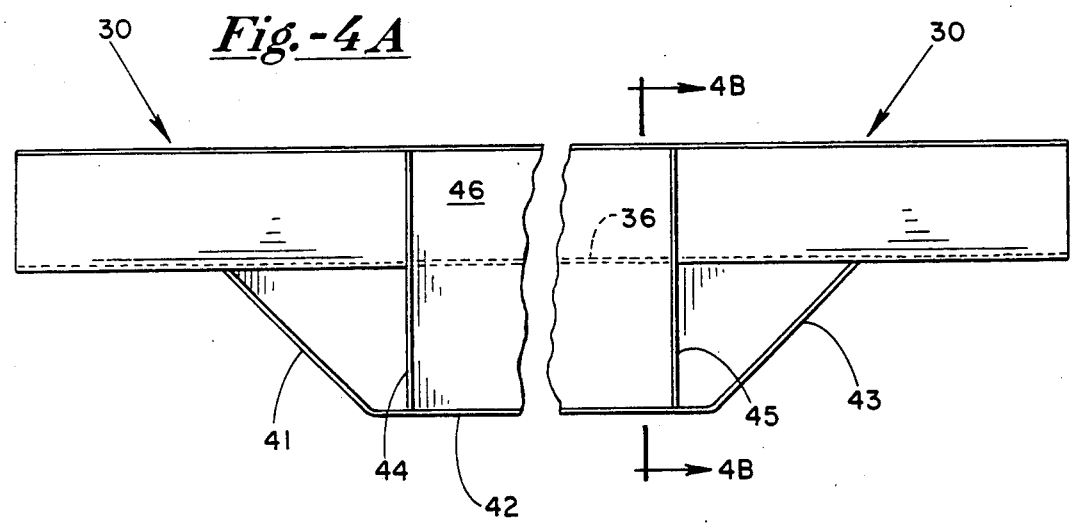
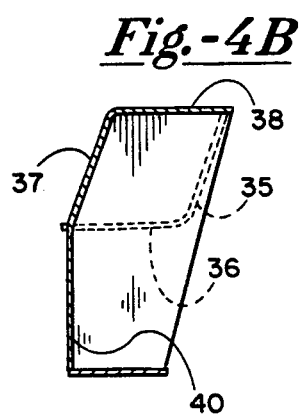

STRUCTURE FOR CENTER OF GRAVITY ENHANCEMENT FOR REAR LOADING COMPACTOR

BACKGROUND OF THE INVENTION

1. Field of the Invention

The present invention is directed generally to truck bodies designed specifically for refuse hauling and, more particularly, to an improved rear transfer bracing system for a rear loading compactor refuse hauling truck body which enables the tailgate assembly and thus the center of gravity of the payload to be moved forward toward the front axle to improve load balance.

2. Related Art

Refuse pick-up trucks and other specialty vehicles commonly include a standard truck chassis fitted with a distinctly configured separate body that is designed and built to be installed on and to coordinate with the particular chassis. Normally, the truck chassis is obtained from a different manufacturer by the manufacturer of the truck body, the truck body installed on the chassis and the entire unit thereafter sold by the manufacturer of the truck body. The refuse truck body itself is, then, specifically designed for receiving, compacting, hauling and discharging refuse materials and includes all the associated operating mechanisms. One successful design for refuse hauling truck bodies, commonly known as a "rear loader", includes a main refuse hauling reservoir accessible for loading and discharge from the rear of the vehicle. An hydraulic compacting mechanism repeatedly compacts the refuse after each loading. In this manner, refuse eventually fills the available or usable reservoir volume extending from the front end back toward the rear of the body until no more material can be compacted.

Refuse is loaded through a rather large, heavy tailgate section which includes a receiving hopper into which general refuse, cans or the like, can readily be dumped and from which the large container or holding reservoir is loaded or packed. A packer blade mechanism operated by hydraulic cylinders moves the refuse from the hopper sweeping it into the body of the vehicle and compacting it therein. Both the hopper and the packer blade mechanism are contained in and supported by the tailgate section which extends in cantilever fashion for quite a distance, behind the rear wheels. The tailgate section is connected to the truck body by hinges at the top rear; the bottom of the tailgate section is normally latched to the rear structural supports on either side of the refuse truck body. During ejection of the accumulated contents at a landfill, or the like, the tailgate is unlatched and swung upward up out of the way while the contents of the reservoir are ejected utilizing a cylinder-operated ejection mechanism in a well-known manner.

The ejection mechanism, itself, includes a rather large sweeping wall or blade structure which forms the forward wall of the truck body against which the refuse is compacted during loading and moves aft in the manner of a plow to expel the entire contents of the refuse volume during ejection. Typically, the ejection mechanism is supported from a plurality of load bearing sliders which ride in a trough recess in the truck body floor. A telescoping ejection cylinder in the trough is connected to and operates the ejection mechanism back and forth. When the cylinder is fully retracted or collapsed, the ejector is in the fully forward position; and when the cylinder is fully extended, the ejector mechanism is fully aft in the truck body.

More importantly, however, with regard to load distribution, the ejection cylinder, even though it be a telescoping cylinder, in its fully retracted position still requires a considerable amount of space behind the cab. To accommodate the cylinder, the lower part of the ejector mechanism is angled sharply toward the rear of the truck body. This creates a wedge-shaped void space behind the cab that produces a rearward shift in the center of gravity of the payload.

The rather large, heavy tailgate section, which includes the lift and compacting mechanisms, extends beyond the end of the truck chassis a considerable distance creating a rather lengthy overhang with respect to the rear wheels of the truck. This puts additional loading on the rear wheels which, when combined with the effect of the wedge-shaped void of the lower portion of the front of the reservoir, results in an overall load distribution which is centered too far rearward with respect to the truck chassis. Too great a share of the load is carried by the rear wheels. Payloads, in fact, may be reduced simply because the resulting load distribution places so much of the load over the rear wheel assembly that is exceeds the legal axle load limit before the truck is fully loaded.

Redistribution is difficult for several reasons. The distance between the tailgate and the rear axle cannot readily be shortened because the truck chassis must extend rearward beyond the rear wheel carriage to accommodate large leaf springs which support the weight carried by the rear wheels. Because the chassis cannot be shortened beyond the end of the rear springs and spring supports, the shortest distance that can separate the rear wheels from the end of the truck body and, thus, the forward edge of the tailgate, is fixed. The loading trough of the tailgate, of course, must extend downward behind the end of the truck chassis.

Further, because of the very large weights and stresses involved with the load, tailgate and associated mechanisms, a heavy continuous lower rear transfer brace is required to be placed across the width of the truck body. This brace is at the same level as the main longitudinal truck chassis members and extends across the ends thereof usually abutting them.

Given the weight and design limitations that exist, it is apparent that any modification of the truck body or body/chassis interface which results in shifting the center of gravity of the load, tailgate and body forward even a small distance so that more weight is carried by the front axle would be difficult but extremely desirable. It would possibly increase the total legal payload for the refuse hauling vehicle, and also provide a safer load in terms of balance improving steerability and the general control which the driver has over the vehicle.

SUMMARY OF THE INVENTION

The present invention concerns improvements to the rear cross support system or rear transfer bracing system of a rear loading compactor refuse truck body which allows the tailgate supporting section of the rear of the truck body to be moved forward with respect to the truck chassis and the rear wheels. This is accomplished by the provision of an unique modified continuous lower rear transfer bracing beam system which both increases the overall strength of the truck body and, at the same time, accommodates the rear portion of the corresponding truck chassis members. By means of the present invention, the central portion of the transfer brace member is provided with a recess to accommodate the ends of the longitudinal chassis struts by lowering the load carrying lower flange beneath the level of the struts so that the ends of the chassis struts can abut directly against the rearmost vertical webbing section of the transfer brace member. This involves partially removing a central section of the transfer brace and moving the bottom support flange downward by means of additional spaced strut members and extending the webbing beneath the level of the chassis struts. This, in effect, provides an elongated central opening in the rear transfer member to accommodate the chassis frame and rear spring supports without affecting the continuous support provided by the continuous transfer brace.

BRIEF DESCRIPTION OF THE DRAWINGS

In the drawings wherein like numerals are utilized to designate like parts throughout the same:

FIG. 1 is a fragmentary view of the rear portion of a typical rear-loading refuse vehicle fitted with the improved body transfer brace construction in accordance with the invention;

FIG. 2 depicts an enlarged fragmentary detail of the truck chassis interface with the transfer brace construction of the present invention;

FIG. 3 is a greatly enlarged fragmentary perspective view of the brace construction of the invention;

FIGS. 4A and 4B represent a side elevational view and an end view, respectively, of the modified transfer brace construction of the invention.

DETAILED DESCRIPTION

Figure 5:
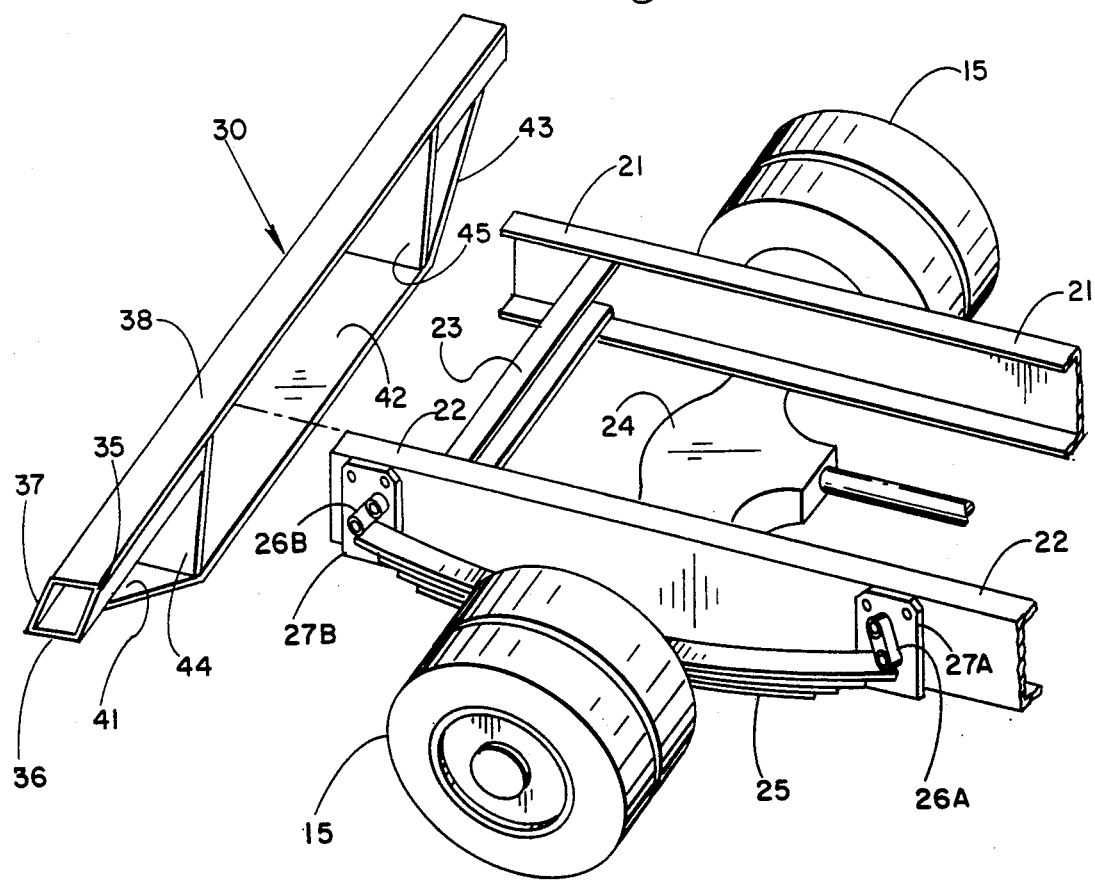
FIG. 5 is an exploded perspective view of a transfer brace and rear truck chassis arrangement in accordance with the invention.

The detailed description depicts one or more specific forms of the present invention and as such are meant to be representative rather than limiting or exhaustive as to the scope of the invention itself. It is contemplated that other possible configurations might occur to those skilled in the art.

FIG. 1, generally at 10, depicts a fragmentary view of the rear portion of a typical refuse vehicle in which a rear loading truck body 11 is carried by a heavy truck chassis, a portion of which is shown at 12. The tailgate assembly of the refuse truck body is shown generally at 14 and is cantilevered and extends for a considerable distance behind the rear wheel 15. The tailgate assembly, which also forms the rear closure for the refuse storage compartment in body 11, is shown in a closed position and, as can be seen from FIG. 1, the tailgate comprises a rather large, heavy and extensive mechanism. The tailgate section 14 includes rather heavy substantial vertical primary structural members on each side as at 16 by means of which the tailgate section is hinged to pivot about a pair of large pins as at 17. An optional container tipping system operated by a cylinder 18 is also shown. The tailgate assembly includes a plurality of structural brace members connected by welded sheets to form a rather substantial structure. Main rear truck braces as at 20 abut tailgate strut members as at 19 when the tailgate is fully closed.

Of course, the refuse storage compartment itself may be of any well-known type and includes a compacting system (not shown) and an ejection system including a plate (not shown) which serves as a reaction member against which the refuse placed initially in the tailgate is compacted. It is believed that the compacting and ejection mechanisms of the class are well known in the art and since their particular structure per se forms no part of the present invention, they need not be discussed in further detail.

The truck chassis itself is of a class of conventional chassis including a steerable front axle assembly, etc. which are well known and upon which specialized bodies such as refuse hauling truck bodies are mounted. Specifically, as will be discussed in greater detail with respect to FIGS. 2 and 5, the chassis contains a pair of very heavy centrally located spaced parallel longitudinal channel members or longitudinal stringers 21 and 22 with cross members as at 23 forming the core and providing the strength for the chassis itself. The chassis further includes a rear axle assembly depicted at 24, a pair of heavy leaf springs, one of which is illustrated at 25, with front and rear retainers 26A and 26B fixed to respective mounting plates 27A and 27B.

It will be appreciated with respect to rear loading compacting refuse truck bodies of the class to which the invention pertains are so constructed that the great bulk of the payload weight is, of necessity, carried on the rear axle by the rear wheel assembly. This is the case whether a single axle carriage support system (as illustrated herein) or a dual axle carriage support system is used. A dual-wheel support is illustrated, for example, in De Filippi U.S. Pat. Nos. 4,627,783 and 4,877,366. A further single rear-wheel type vehicle is illustrated by Smith (U.S. Pat. No. 4,427,231). These are cited to further illustrate typical truck construction including the rearward location of the load center and the relative significance of the overhang occasioned by the truck body tailgate assembly with respect to the chassis rear wheels.

With respect to producing a more favourable forward shift of the center of gravity of the load, it is apparent from the state-of-the-art that any improvement which enables the rear wheel carriage of the truck to be mounted even a small distance closer to the tailgate would be extremely beneficial with respect to overall load support by shifting the center of gravity of the load forward and an amount of the weight to be carried by the front wheels. This has been found to be extremely important with respect to reducing the weight carried by the rear axle thereby increasing the total legal weight that can be carried by the vehicle. Therefore, it will be appreciated that an invention that enables any forward shift of the center of gravity of the load is extremely beneficial to the overall system.

The present invention enables the tailgate assembly to be mounted closer to the rear wheels by the provision of a special cross support or transfer bracing system that is designed to contain the ends of the main truck chassis longitudinal structural members such that the rear truck support member, and therefore the tailgate, can be moved closer to the rear axle thereby shifting the load further forward. The modified cross support beam structure in the invention is illustrated in FIGS. 2-5. As can be seen in FIGS. 2-5, the bottom rear refuse truck body support member is conventionally in the form of a large tubular beam 30, normally in the shape of a parallelogram or rhombus and extending the full width of the truck body. This cross member typically abuts the main longitudinal truck chassis members 21 and 22, in FIGS. 2 and 5. The rear tailgate-supporting truck body construction requires that an extremely strong member extend the full width of the truck body. This heretofore always meant that the rear end of the members 21 and 22 would abut against the outer edge 3 of the tubular transfer brace 30 so that the truck chassis ended at a plane represented by the phantom line 33 (FIG. 2).

The modified structure of the present invention enables the brace member 30 and the main longitudinal members 21 and 22 to be, in effect, enmeshed in a combined structure which actually strengthens the refuse truck body transfer brace member and achieves a relative forward movement of the tailgate and body section relative to the lower truck chassis by a distance 34. The central segment of a portion of the tubular structural member 30, including side 35 and a portion of side 36, is removed leaving sides 37 and 38 intact. Auxiliary central reinforcement is provided by the addition of web member 40 connected by bypass bottom flange members 41, 42 and 43. Additional stabilizing plate members are provided at 44 and 45. This, then, creates a rather large hollow channel-shaped cut-out area described by the flange 42, top tubular side 38 and a webbing member 40 connected to and extending tubular side 37. This recess accommodates the end portions of the longitudinal supports or chassis beams 21 and 22 thereby allowing the whole assembly to be compacted together or intermeshed by the distance 34 (FIG. 2).

The modified structural system of the invention reduces the tailgate overhang or cantilever by the width of the tubular beam 30. This may amount to as much as about six inches which is sufficient to produce significant improvement in the allowable truck load.

Not only does the modified structural cross beam system of the invention enable the entire tailgate mechanism to be moved closer to the rear wheels, it also has been found to add a great deal of overall structural strength to the truck body by providing a much stronger structural member. It has been the custom in the manufacture of such truck bodies in the past to utilize very high tensile strength, i.e., 100,000 psi yield strength steels, for the tubular members 30 in order to provide sufficient strength to support the mechanisms and load associated with the receiving and compacting of the refuse material. The additional strength imparted to this system by the modified rear transfer brace member of the present invention has enabled less exotic and less expensive, i.e., 50,000 psi yield steels, to replace the very high performance steels formerly required. This results in an additional cost reduction benefit with respect to the manufacture of the truck body.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to equipment details and operating procedures, can be accomplished without departing from the scope of the invention itself.

What is claimed is:

1. In a rear loading, compactor type refuse truck body having a tailgate and a continuous lower rear transfer brace member having spaced upper and lower horizontal flanges spaced by front and rear spaced webs, the webs disposed to form an acute angle with the vertical thereby forming a composite crossection generally in a shape of a tubular parallelogram having a height and width sufficient to support the tailgate, the truck body further being designed to be accommodated on a truck chassis having a pair of spaced, substantially parallel horizontal longitudinal main chassis members having a height greater than that of the continuous transfer brace and having rearward directed ends which abut the front web of the continuous transfer brace and thereby space the frame for an opening closed by the tailgate from rear wheels, the improvement comprising a central recess in the lower transfer brace member which accommodates rearward directed ends of the spaced longitudinal main chassis members and allows them to abut the rear web of the lower rear transfer brace member without loss of continuity of support to thereby allow the frame for the opening closed by the tailgate to be moved forward and mounted closer to the rearward directed ends of the main chassis members.

2. The apparatus of claim 1 wherein the central recess is created by removing the lower flange and front web for a desired span, extending the rear web downward and providing a by-pass lower horizontal flange extending along a length of the extended web and connected to the lower horizontal flange on both sides beyond the central recess.

3. The apparatus of claim 2 further comprising a pair of essentially vertical, spaced, oppositely disposed stabilizing plate members flanking the central recess abutting a front side of the rear web and web extension connected between the upper horizontal flange and the by-pass lower horizontal flange.

* * * * *